(12) United States Patent
Whitaker et al.

(10) Patent No.: US 10,372,121 B2
(45) Date of Patent: Aug. 6, 2019

(54) DETERMINATION OF CONTINUOUS USER INTERACTION AND INTENT THROUGH MEASUREMENT OF FORCE VARIABILITY

(71) Applicant: Ford Global Technologies, LLC, Dearborn, MI (US)

(72) Inventors: Matthew Atwood Whitaker, Novi, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/138,716

(22) Filed: Apr. 26, 2016

(65) Prior Publication Data

US 2017/0308075 A1 Oct. 26, 2017

(51) Int. Cl.
*G05D 1/00* (2006.01)
*B60W 10/04* (2006.01)
*B60W 10/18* (2012.01)
*B60W 10/20* (2006.01)
*B60W 30/18* (2012.01)
*B62D 1/00* (2006.01)
*B62D 15/02* (2006.01)

(52) U.S. Cl.
CPC .......... *G05D 1/0016* (2013.01); *B60W 10/04* (2013.01); *B60W 10/18* (2013.01); *B60W 10/20* (2013.01); *B60W 30/18* (2013.01); *B60W 30/18009* (2013.01); *B62D 1/00* (2013.01); *B62D 15/027* (2013.01); *B62D 15/0285* (2013.01); *B60K 2370/573* (2019.05); *G05D 2201/0213* (2013.01)

(58) Field of Classification Search
None
See application file for complete search history.

(56) References Cited

U.S. PATENT DOCUMENTS

| 8,952,987 | B2 | 2/2015 | Momeyer et al. |
| 9,008,860 | B2 * | 4/2015 | Waldock .............. G05D 1/0044 340/4.61 |
| 9,056,549 | B2 * | 6/2015 | Pala ....................... B60K 35/00 |

(Continued)

FOREIGN PATENT DOCUMENTS

| CN | 205769271 U | 12/2016 |
| DE | 102012221036 A1 | 5/2014 |

(Continued)

OTHER PUBLICATIONS

Search Report dated Aug. 30, 2017, for GB Patent Application No. GB1706592.1 (5 pages).

*Primary Examiner* — Tamara L Weber
(74) *Attorney, Agent, or Firm* — Frank Lollo; Neal, Gerber & Eisenberg LLP; James P. Muraff

(57) ABSTRACT

A system for controlling a vehicle from a remote device, such as a mobile device, is disclosed. In one embodiment, the mobile device includes a mobile phone. In other embodiments, any device capable of receiving user input to control the movement may be used. In one embodiment, the system includes a user input receiving module coupled to a processor and configured to receive variations in user input forces applied to a touch-sensitive user interface over a period of time, wherein the intentional or unintentional variations in user input forces over the period of time are indicative of user intent to control the vehicle.

17 Claims, 5 Drawing Sheets

(56) References Cited

U.S. PATENT DOCUMENTS

| | | | |
|---|---|---|---|
| 9,513,631 B2* | 12/2016 | Boos | G05D 1/0044 |
| 2009/0140985 A1 | 6/2009 | Liu | |
| 2009/0237374 A1 | 9/2009 | Li et al. | |
| 2011/0242052 A1 | 10/2011 | Ningrat | |
| 2012/0126941 A1* | 5/2012 | Coggill | G06F 21/36 |
| | | | 340/5.54 |
| 2014/0277850 A1 | 9/2014 | Jobs et al. | |
| 2014/0340204 A1 | 11/2014 | O'Shea et al. | |
| 2015/0022468 A1* | 1/2015 | Cha | G06F 3/0416 |
| | | | 345/173 |
| 2015/0363988 A1 | 12/2015 | Van Wiemeersch et al. | |
| 2015/0375741 A1 | 12/2015 | Kiriya | |
| 2016/0034088 A1* | 2/2016 | Richards | G01L 1/205 |
| | | | 345/173 |
| 2016/0195931 A1* | 7/2016 | Czelnik | G06F 3/016 |
| | | | 345/173 |
| 2016/0321848 A1* | 11/2016 | Ricci | G07C 9/00158 |
| 2016/0378106 A1* | 12/2016 | Xie | G07C 5/06 |
| | | | 701/2 |
| 2017/0108857 A1* | 4/2017 | Line | B64C 39/024 |

FOREIGN PATENT DOCUMENTS

| | | |
|---|---|---|
| DE | 102013213754 A1 | 1/2015 |
| EP | 2316709 B1 | 8/2013 |
| EP | 2886420 A1 | 6/2015 |
| EP | 3159053 A1 | 4/2017 |
| WO | WO 02/35460 A1 | 5/2002 |
| WO | WO 2015010752 A1 | 1/2015 |

\* cited by examiner

DETERMINATION OF CONTINUOUS USER INTERACTION AND INTENT THROUGH MEASUREMENT OF FORCE VARIABILITY

BACKGROUND

This application relates generally to the field of remote vehicle operation, and more particularly to systems and methods for remotely controlling the movement of a vehicle.

Remote Park Assist (RPA) systems for vehicles allow a driver or operator located outside of the vehicle to remotely control the movement of the vehicle for the purposes of parking or unparking the vehicle. RPA systems may be desirable to help maximize the number of vehicles that can fit within a fixed area with limited parking spaces or a narrow garage. Known RPA systems, however, require continuous action by the user or a two-hand use of multiple switches to ensure that communication between the remote device and the vehicle is originating from a user with direct intent to perform the RPA function. This is required throughout the parking maneuver to ensure safety of vehicle occupants and people or property in the vicinity of the vehicle to be remotely parked.

But continuous communication creates a number of challenges. Communication may be interrupted by incoming calls to the user or by unintended changes in state of software applications running on the user's device. In addition, continuous communication may be coupled with other requirements, including the requirement that two hands be required to either operate an "user intent switch" (aka dead-man's switch) or otherwise to ensure that vehicle movement commands are intended. In addition, distractions may interrupt an operator who must provide focused attention to ensure continuous movement commands are received by the vehicle. Environmental conditions, such as rain droplets registering on an interface of a user's device, may falsely resemble user intent by causing adjacent icons to electrically combine, resulting in unintended movement commands being sent to the vehicle.

There exists a need, therefore, for a system or method that solves these problems.

SUMMARY

A system for remotely controlling a vehicle is disclosed. In one embodiment, the system includes a vehicle including an electronically actuated steering system, an electronically actuated drive system, an electronically actuated brake system, a processor, and memory, and a control module coupled to the processor and configured to receive random variations in user input forces applied to a remote touch-sensitive user interface over a period of time, where the random variations in user input forces over the period of time that lie within predetermined force thresholds are indicative of user intent to control the vehicle.

The system may include a mobile device having the user interface. The mobile device may include at least one user selectable display object configured to activate a graphical display of information in the user interface, and the mobile device includes one of a display fob, a mobile phone, a tablet, or a laptop. The mobile device may include at least one interface object configured to activate an instruction to move the vehicle. The control system may be configured to transmit to the user interface to display a confirmation that the instruction to move the vehicle lies within the predetermined force thresholds.

The vehicle may include a wireless communication module configured for receiving wireless messages containing the variations in user input forces over the period of time from the mobile device. The wireless messages may be received from the mobile device via at least one of WiFi, BLUETOOTH, cellular, Low Frequency (LF), near field communication (NFC), and non-cellular Ultra High Frequency (UHF), and the wireless communication module is configured to transmit a confirmation message to the mobile device that the variations in user input forces over the period of time lie within the predetermined force thresholds. The wireless messages may be communicated directly to and from the vehicle and the mobile device or may be relayed to and from the vehicle via a cloud server.

The vehicle may include an authentication module configured to determine whether the variations in user input forces over the period of time lie within the predetermined force thresholds. The authentication module may be configured to determine a statistical variation of the user input force over the period of time. The authentication module may be configured to authenticate and/or authorize a user to enable authenticated access to the system to remotely command and control the movement of the vehicle.

The system may include an authentication module configured to authenticate a user to enable authenticated access to the system to remotely command and control the movement of the vehicle, and the control module may be configured to determine whether the variations in user input forces over the period of time lie within the predetermined force thresholds and control a function or a movement of the vehicle. The system may include a remote park assist module or a collection of modules configured to control a movement of the vehicle based on the variations in the user input forces over the period of time.

A function of the vehicle may be activated when all variations in the user input forces over the period of time lie within a fixed range surrounding a predetermined pattern of input force variations over the time period. A function of the vehicle may be activated when all variations in the user input forces over the period of time match a predetermined pattern of input force variations over the time period. A function of the vehicle may be activated when variations in the user input forces over the period of time lie above and below one of the predetermined thresholds and match a predetermined pattern of input force variations over the period. A function of the vehicle may be activated when variations in the user input forces over the period of time and the x-y coordinate positions of the user input lie within a range of thresholds associated with a predetermined pattern of input force variations and predetermined x-y coordinate positions over the period.

In another embodiment, a system for remotely controlling a vehicle is disclosed, comprising: (1) a vehicle including an electronically actuated steering system, an electronically actuated drive system, an electronically actuated brake system, a processor, and memory; (2) a control module coupled to the processor and configured to receive variations in user input forces on a user interface of a mobile device over a period of time; and (3) an authentication module configured to determine whether the variations in user input forces over the period of time match predetermined force patterns, wherein the variations in user input forces over the period of time are indicative of user intent to remotely control the vehicle.

The vehicle may include a wireless communication module configured for receiving wireless messages containing the variations in user input forces over the period of time from the mobile device. A function of the vehicle may be activated when all variations in the user input forces over the period of time lie within a fixed range surrounding a predetermined pattern of input force variations over the time period.

In another embodiment, a system for remotely controlling a vehicle is disclosed, comprising: (1) a vehicle including an electronically actuated steering system, an electronically actuated drive system, an electronically actuated brake system, a processor, and memory; (2) a control module coupled to the processor and configured to receive variations in user input forces on a user interface of a mobile device over a period of time; (3) a wireless communication module configured for receiving wireless messages containing the variations in user input forces over the period of time from the mobile device; and (4) an authentication module configured to determine whether the variations in user input forces over the period of time match predetermined force patterns, wherein the variations in user input forces over the period of time are indicative of user intent to remotely control the vehicle.

A function of the vehicle may be activated when variations in the user input forces over the period of time lie above and below a threshold and match a predetermined pattern of input force variations over the period. a function of the vehicle may be activated when variations in the user input forces over the period of time and the x-y coordinate positions of the user input lie within a range of thresholds associated with a predetermined pattern of input force variations and predetermined x-y coordinate positions over the period.

DETAILED DESCRIPTION

Figure 1A:
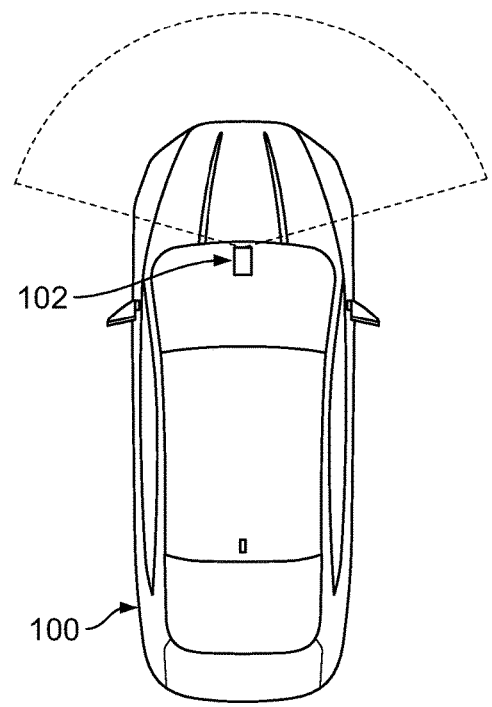
FIG. 1A illustrates a top view of a vehicle of the instant disclosure.

Although the figures and the instant disclosure describe one or more embodiments of a system by which user intent to remotely control and/or move a vehicle is inferred through natural or specified variations in finger forces received and/or measured by a user interface, one of ordinary skill in the art would appreciate that the teachings of the instant disclosure would not be limited to these embodiments.

Turning now to the drawings wherein like reference numerals refer to like elements, there are shown exemplary embodiments and methods by which user intent to remotely control and/or move a vehicle is inferred through natural or specified variations in finger forces received and/or measured by a user interface. In connection with remotely commanding the motion or movement of a vehicle, a user's hand or finger motion across a two dimensional, touch-sensitive, user interface or display may be resolved in two dimensions by registering the x-y coordinates of the user's hand or finger motion across the user interface or display. The amount of force applied by a user's hand or finger motion in the "z-direction" on the user interface or display may also be measured and interpreted. The instant disclosure contemplates using variations in force received from a user's hand or finger motion to determine the user's intent to remotely and automatically cause the movement of a vehicle from one position to another.

Figure 1B:
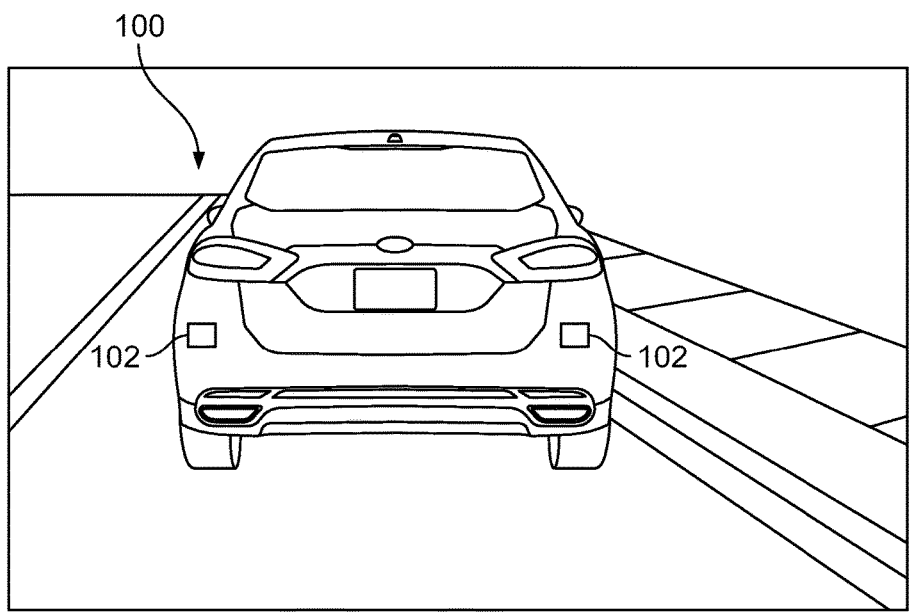
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
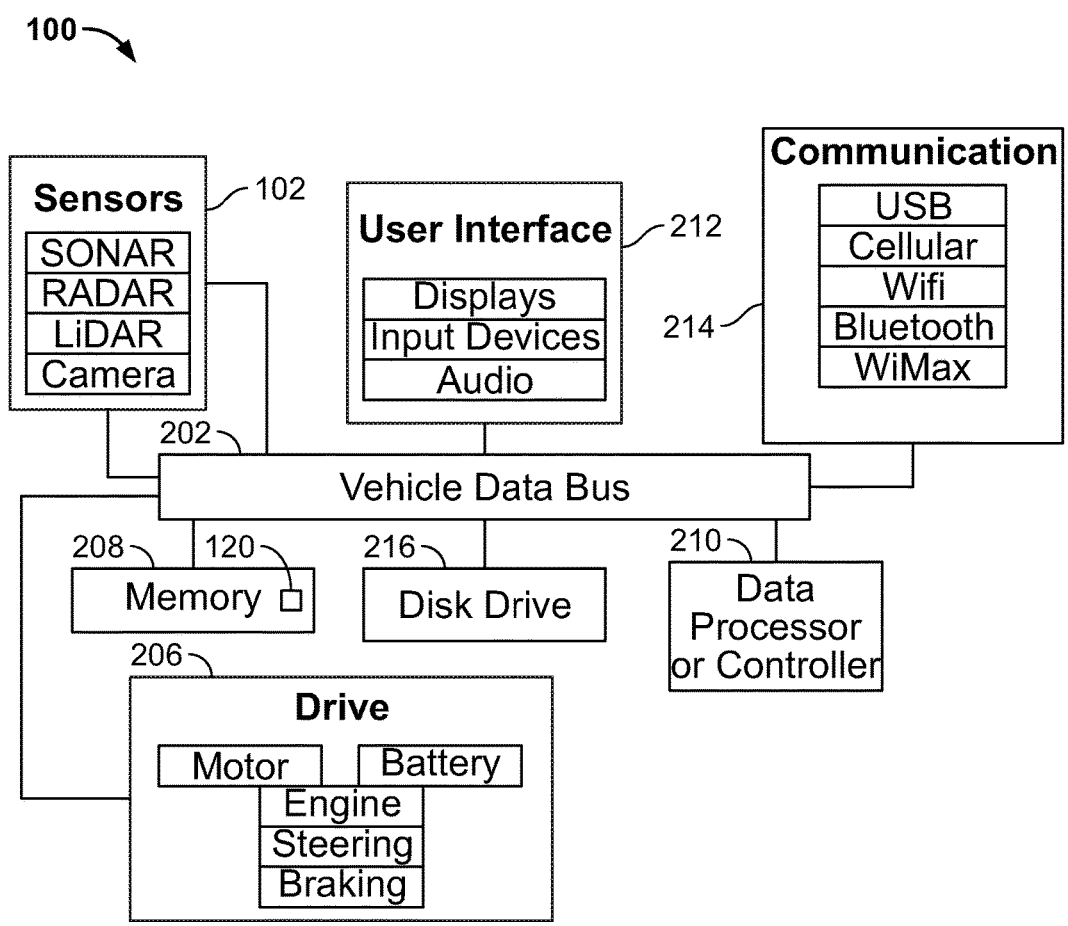
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors, obstacle sensors, or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; (16) occupant sensors; or (17) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle motion control devices 206, memory or data storage 208, a processor or controller 210, a user interface 212, communication devices 214, and a disk drive or other data storage device 216.

Vehicle 100 may include one or more actuators for controlling a function or motion of vehicle 100. In some embodiments, vehicle motion control devices 206 of vehicle 100 includes an Esteering system, an Edrive system, and an Ebrake system.

An Esteering system may include an electric power-assist steering (EPAS) system and/or an electronically controlled steering-by-wire system for autonomously steering vehicle 100 according to a command originating from or communicated to vehicle 100.

An Edrive system may include an electronic transmission gear selector and/or electronically controlled drive-by wire system for autonomously selecting and/or actuating a desired transmission gear or drive selection (i.e., forward/reverse/speed/acceleration) of vehicle 100 according to a command originating from or communicated to vehicle 100. An Edrive system may also include an electronic throttle control (ETC) and/or an electronically controlled throttle-by-wire system for autonomously adjusting a throttle position and/or acceleration of vehicle 100 according to a command originating from or communicated to vehicle 100.

An Ebrake system may include an electronically controlled brake system (EBS) and/or electronically controlled brake-by-wire system for autonomously braking the vehicle 100 according to a command originating from or communicated to vehicle 100.

Vehicle motion control devices 206 may include one or more electronic controllers, one or more electric motors, one or more servos, one or more switches, one or more relays, one or more actuators, one or more timers, counters, and/or clocks, one or more batteries, and one or more sensors. The one or more sensors may include a torque sensor, a force sensor, a steering angle sensor, a position sensor, a speed sensor, an accelerometer, a throttle position sensor, a temperature sensor, a pressure sensor, a proximity sensor, an image detection sensor, or any other sensor suitable for detecting a status or condition.

In some embodiments, vehicle 100 may include one or more actuators, motors, servos, switches, relays, or controllers for controlling exterior or interior lights, the vehicle's horn or other audio equipment, one or more interior or exterior mirrors, powered running board motors, a powered convertible roof, powered tonneau covers, and the like.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WMAX; BLUETOOTH; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or BLUETOOTH interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive or other data storage device 216 may include a computer-readable medium. The computer-readable medium may include one or more sets of computer readable instructions stored thereon. The instructions may embody one or more of the methods or logic as described herein. In some embodiments, the instructions may reside completely, or at least partially, within any one or more of the main memory 208, the computer-readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms 120 generate or select instructions for other elements of the vehicle to perform. In various embodiments, the one or more computer programs or subprograms 120 are configured to direct instructions to the user interface 212, the communication devices 214, the vehicle motion control devices 206, the sensors 102, the processor 210, and any other component operatively connected to the vehicle data bus 202. It should be appreciated that vehicle 100 may be fully autonomous or partially autonomous.

Figure 3:
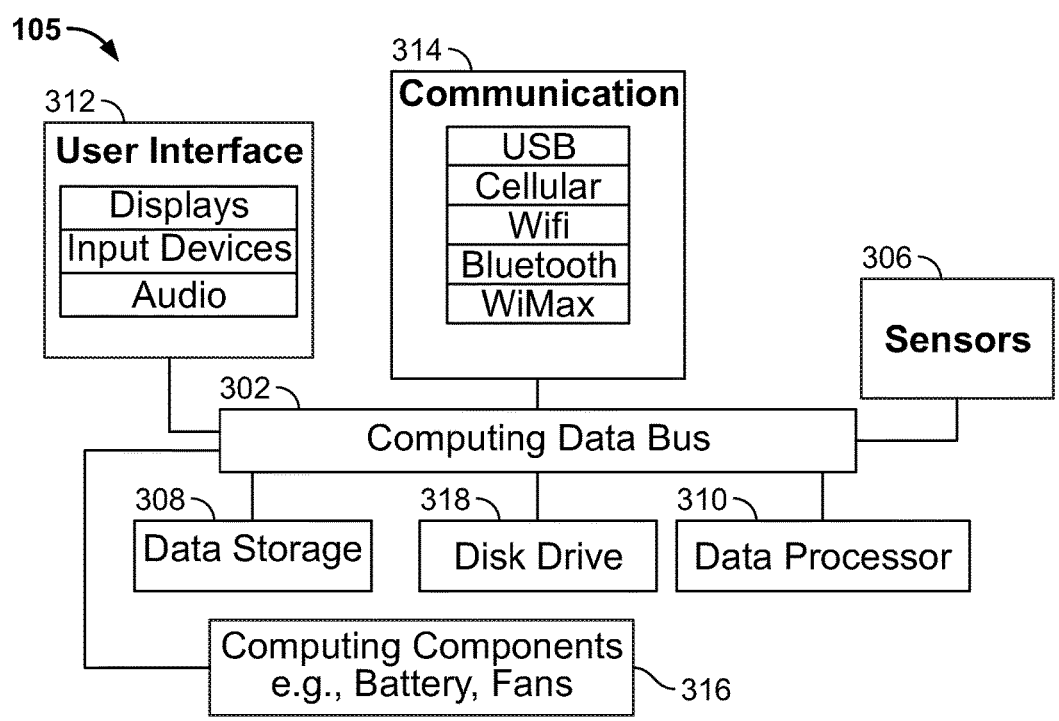
FIG. 3 illustrates a block diagram of an exemplary computing device operatively connected to the vehicle shown in FIG. 1A.

In various embodiments, a computing device 105 is operatively connected to the vehicle 100 via any suitable data connection such as WiFi, BLUETOOTH, USB, cellular, Low Frequency (LF), near field communication (NFC), or non-cellular Ultra High Frequency (UHF) data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 may be a mobile phone, a tablet computer, a laptop computer, a display fob (i.e., a key fob having a display that may or may not be a touchscreen display), or a server.

Figure 4:
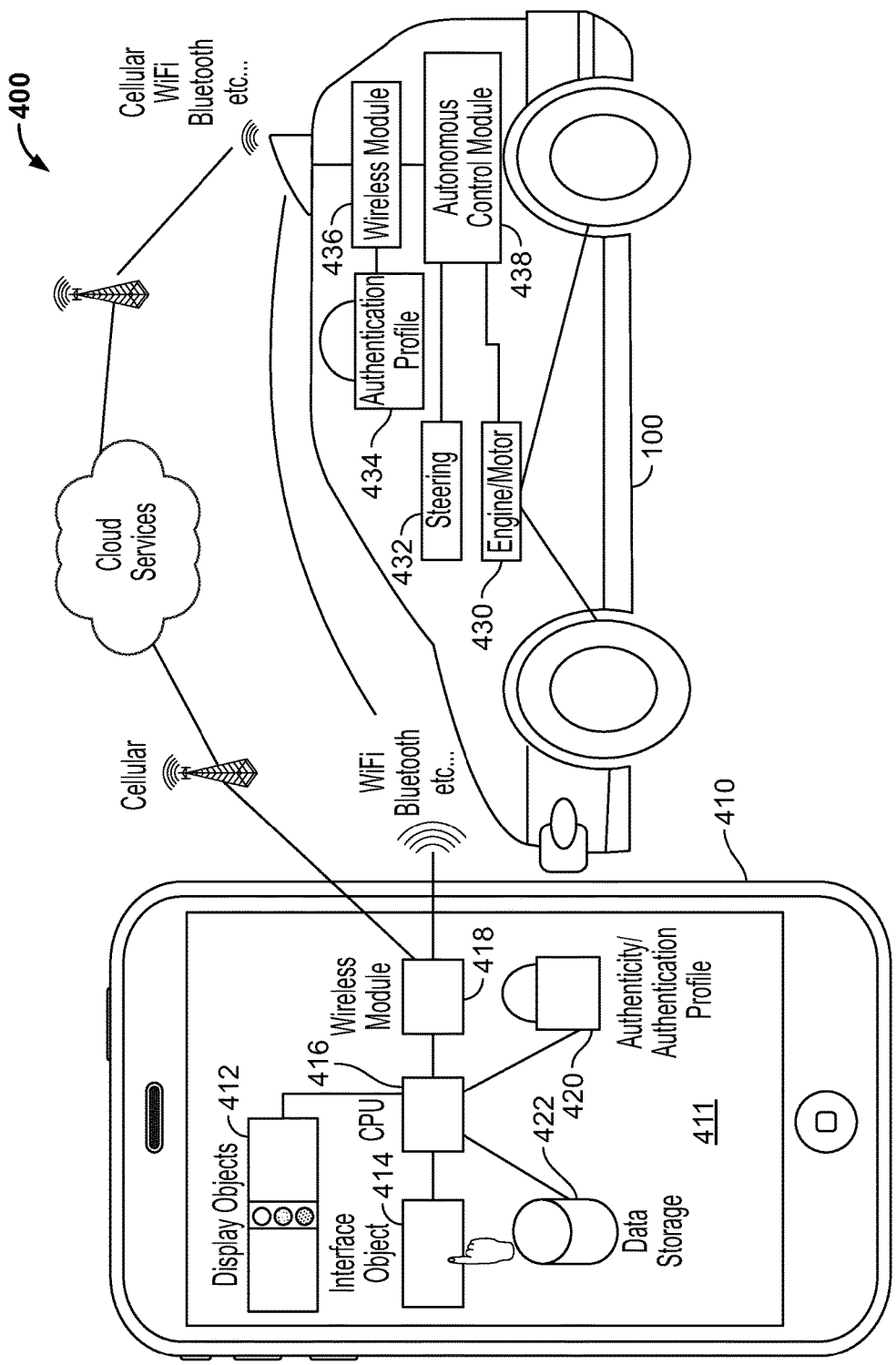
FIG. 4 illustrates an embodiment of the instant disclosure.

Turning to FIG. 4, there is shown an example system 400 for remotely controlling the movement of a vehicle 100 from a remote device, such as a mobile device. In this embodiment, the device includes a mobile phone, such as a smartphone, a tablet computer, a laptop computer, a display fob (i.e., a key fob having a display that may or may not be a touchscreen display). The device may include a capacitive touch screen interface to receive a user's gestures and forces applied to the interface. In other embodiments, any device capable of remotely receiving user input to control the movement of the vehicle 100 may be used.

In this embodiment, system 400 includes vehicle 100 and mobile device 410. Vehicle 100 includes engine control module 430, steering control module 432, authentication/authorization module 434 containing user profile information, communications module 436, and control module 438. Mobile device 410 includes user interface or display 411, display objects 412, interface objects 414, processor 416, memory 422, communications module 418, and authentication/authorization module 420 containing user profile information. Vehicle 100 may include any of the features described above, including any of the sensors, actuators, motion control devices, processors, controllers, input/output devices, storage devices, interfaces, and combinations thereof.

Authentication/authorization module 434 on the vehicle side and authentication/authorization module 420 on the device side may each be configured to authenticate and/or authorize a user to enable authenticated access to vehicle 100 to remotely command and control the movement of vehicle 100. These modules may also be used to authenticate a data stream to and from vehicle 100 to ensure instructions to move the vehicle 100 fall within expected boundaries. In some embodiments, after authentication/authorization modules 420,434 authenticate and/or authorize a user to enable authenticated access to vehicle 100 to remotely command and control the movement of vehicle 100, control module 438 may be configured to ensure instructions to move the vehicle 100 fall within expected boundaries.

Any number of protocols known to one of ordinary skill may be utilized to authenticate a user. User profile information and authentication data may be stored in memory 422 on mobile device and in memory in any module on vehicle 100 including control module 438.

Communications module 436 on the vehicle side and communications module 418 on the device side may each include a wireless module for communicating data to and from vehicle 100 and device 410. Any number of wireless protocols known to one of ordinary skill may be utilized to communicate wirelessly between mobile device 410 and vehicle 100 include WiFi, BLUETOOTH, cellular, Low Frequency (LF), near field communication (NFC), and non-cellular Ultra High Frequency (UHF). In addition, wireless communication between mobile device 410 and vehicle 100 may be relayed via any number and type of communication devices, such as one or more computer servers, web servers, cloud servers, gateways, access points, and the like. In one embodiment, wireless communication between mobile device 410 and vehicle 100 may be conducted via an array of Wi-Fi hot spots making up a local private network. In another embodiment, wireless communication between mobile device 410 and vehicle 100 may be conducted via a private cellular network. In one embodiment, wireless communication between mobile device 410 and vehicle 100 is conducted in real-time or near real-time, such as via one or more of the foregoing methods and/or protocols, to eliminate communication latency or delay and to ensure safe movement of vehicle 100.

Interface objects 414 may include any number and type of user selectable objects shown on the display 411 and configured to activate any number of computer functions, routines and/or subprograms. In this embodiment, interface objects 414 are configured to activate a user selectable application, function, computer routine, or subprogram that enables remote control and movement of vehicle 100 by the user. For example, interface objects 414 may include embedded instructions such as forward, backward, or steering controls for commanding the vehicle accordingly.

Display objects 412 may include any number and type of user selectable objects shown on the display 411 and configured to activate any number of functions, computer routines and/or subprograms. In this embodiment, display objects 412 are configured to activate graphical or other display of any number or type of information stored in memory 442. Such instructions may include, for example, the required user x-y motion or z-direction (force) pattern to cause a particular vehicle movement, show results of user input, or provide various application prompts to the user.

To control the movement of vehicle 100 by the user, force-based measurements received by the mobile device 410 in response to a user's input or selection of one or more interface objects 414 may be made and interpreted to determine a user's intent to move the vehicle 100.

In one embodiment, as the user seeks to remotely move vehicle 100, the user may interact with and/or select one or more interface objects 414 on the mobile device 410, such as forward, backward or steering controls. The inputs may be processed by the processor 416, which may reference data stored on memory 422 and/or external API's to determine the profile of the force received on the display 411 that is required to successfully complete the requested action.

Measuring natural variation in the received user input force on the user interface or display 411 over a specified time provides further assurance of the user's intent to move the vehicle 100. In some embodiments, the variation of user input forces received by system 400 may vary randomly within defined force thresholds and be interpreted by system 400 as being indicative of user intent to remotely move or control a function of vehicle 100. In some embodiments, the force variation over the specified period of time may be relatively very small or otherwise imperceptible to the user where the user may unintentionally vary the force in such small amounts. System 400 may nonetheless detect the small variations in force, and if lying within the defined thresholds, may interpret the same as being indicative of the user's intent to remotely command and control the movement of the vehicle 100 or remotely control one or more features or functions of vehicle 100. Alternatively, in some embodiments, if the magnitude of the force over the specified period of time lies within the defined thresholds, system 400 may also be configured to interpret this condition as, for example, a false button press by the user, and therefore interpret the data as an indication not to move or control a function of vehicle 100.

Determining the statistical variation of the measured force, including the range, variance, standard deviation, and the like may be performed. System 400 may match the natural variations in magnitude of user input force received over time to patterns stored in memory 422 to structure a message that is wirelessly received at the vehicle's communications module 436 from the communications module 418 on mobile device 410 that can be used by system 400 to confirm and/or authenticate the user's intent to move the vehicle 100. In this embodiment, the variations in force received by a user's input may be processed on both the mobile device 410 and the vehicle 100. In this way, the mobile device 410 may determine when to send messages and the vehicle 100 may validate those messages against a preprogrammed pattern of force variation over time. Additional information may be presented within or alongside these messages to ensure the message was authenticated and authorized to control the vehicle 100.

Upon receiving the request at the vehicle 100 from the mobile device 410 via communications module 436, control module 438 may compare the message against information stored in memory and authorize/authenticate it to ensure the message is valid. The message may be inspected and/or interpreted to ensure that the received force variations conform to expected and allowable patterns and/or meets specific thresholds. Upon confirmation that the message contains force variations that follow expected patterns or meet specific thresholds, the control module 428 may process a command or control to one or more vehicle systems to move the vehicle as requested by the message received from mobile device 410.

For vehicle functions that require consistent input from the user, system 400 may repeat a message for a given cycle of time. At any point when user force variations in a message received from mobile device 410 no longer conform to expected force patterns and/or meet specific force variation thresholds, system 400 may be configured to halt the motion or movement of vehicle 100 until such time as updated or new messages are received by vehicle 100 that contain data that conform to expected force patterns and/or meet specific force variation thresholds.

Figure 5:
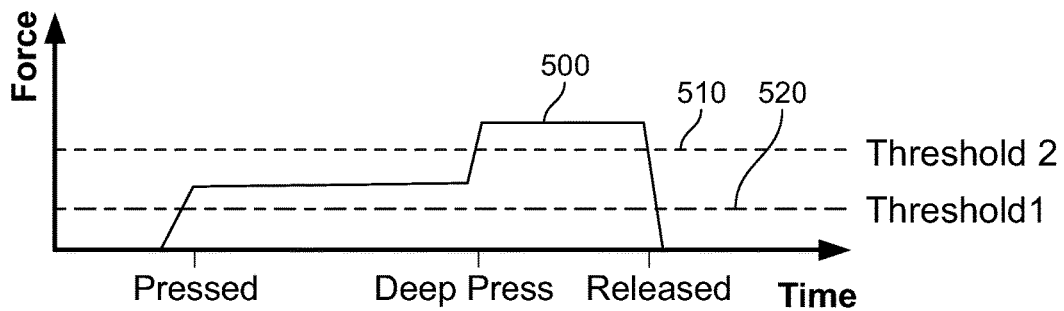
FIG. 5 illustrates a graphical representation of finger force versus time received by a user interface of the instant disclosure.

Turning to FIGS. 5-8 there are shown various graphical representations of methods for receiving and interpreting forces applied to a user interface over a period of time by a user. As shown in FIG. 5, the force 500 received over time may be in the form of a step function, where forces are discerned by the system as either being relatively light, relatively heavy, or somewhere in between. Thresholds 510 and 520 may define upper and lower force boundaries, respectively, for user input forces that a Remote Park Assist system, for example, may validate as evidence of a user's intent to move vehicle 100.

Figure 6:
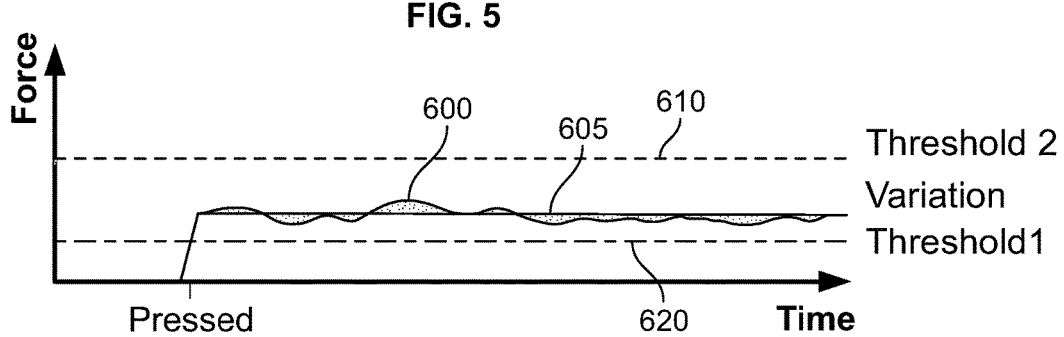
FIG. 6 illustrates another graphical representation of finger force versus time received by a user interface of the instant disclosure.

FIG. 6 is a graphical representation showing how natural user force variations 600 applied to a user interface over a period of time as well as the mathematical mean 605 of such force variations may be measured and/or determined. Thresholds 610 and 620 may define upper and lower force boundaries, respectively, for user input forces that a Remote Park Assist system, for example, may validate as evidence of a user's intent to move vehicle 100. In some embodiments, thresholds 610 and 620 may be defined more narrowly than thresholds 510 and 520. If the magnitude of the force lies within thresholds 610 and 620 over a prescribed period of time, the system, such as system 400, may interpret such data as being indicative of user's intent to remotely move or control the operation of vehicle 100. Detecting an indication of a force and confirming that the force variations over a predetermined time lie within predetermined thresholds may help to ensure no false button presses are captured on the remote device's user interface that would otherwise activate a different software application, execute an unintended function on the remote device, or cause inadvertent movement of the vehicle 100. Alternatively, in some embodiments as discussed above, if the magnitude of the force over the specified period of time lies within thresholds 610 and 620 over the prescribed period of time, the system, such as system 400, may be configured to interpret this condition as being a false button press by the user and therefore interpret the data as an indication not to move or control a function of vehicle 100. The foregoing may help eliminate false instructions received by vehicle 100 from mobile device 410, such as unintended commands registered as a result of rain droplets hitting display 411. In some embodiments, a user's continuous pressing of an interface object 414, such as a button configured to command a particular movement of vehicle 100, may be interpreted by system 400 not only for its indication that interface object 414 has been selected by the user, but also as a confirmation of the user's intent to initiate the command by determining that the natural variations of force applied to the user interface or display 411 over a predetermined period of time lie within predetermined thresholds.

Figure 7:
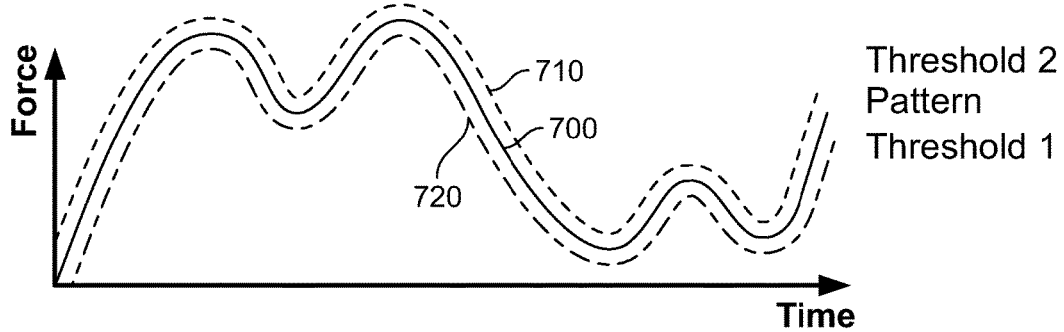
FIG. 7 illustrates another graphical representation of finger force versus time received by a user interface of the instant disclosure.

FIG. 7 is a graphical representation showing how user force variations 700 applied to a user interface over a period of time may be interpreted to activate one or more features or functions of system 400. For example, system 400 may be configured to unlock or activate a particular computer function, routine, or subprogram and cause a desired movement of vehicle 100 or operation of a function of vehicle 100 upon receiving from user interface or display 411 the user's variable force-based pattern over time that system 400 determines as matching a predetermined variable force-based pattern over time. In one embodiment, the variable force-based pattern over time defines a user password for accessing one or more functions of mobile device 410 or of system 400.

Thresholds 710 and 720 may define upper and lower force boundaries, respectively, around a defined target pattern of force variations over a period of time for user input. System 400 may receive and validate user input falling within thresholds 710,720 as evidence of a user's intent to activate a function or to move vehicle 100. The target pattern of force variations may vary dramatically over the time period and may comprise a random or made-up pattern defined by the user. Thresholds 710 and 720 may closely approximate a predetermined, target pattern of forces over time, and received user input force values that lie outside of these thresholds may be indicative of no user intent to activate the function or move vehicle 100. In other embodiments, received user input force values that lie outside of these thresholds for a limited or short period of time in comparison to the total period of time may be ignored by system 400. In this way, temporary or short-lived transients or excursions of force outside thresholds 710, 720 may not be cause for ignoring the user's intent to command a function or movement of vehicle 100. A user's successful matching of the predetermined, target, variable pattern of user input force variations received by system 400 may be interpreted by system 400 as being indicative of user intent to activate a function or to move vehicle 100.

Figure 8:
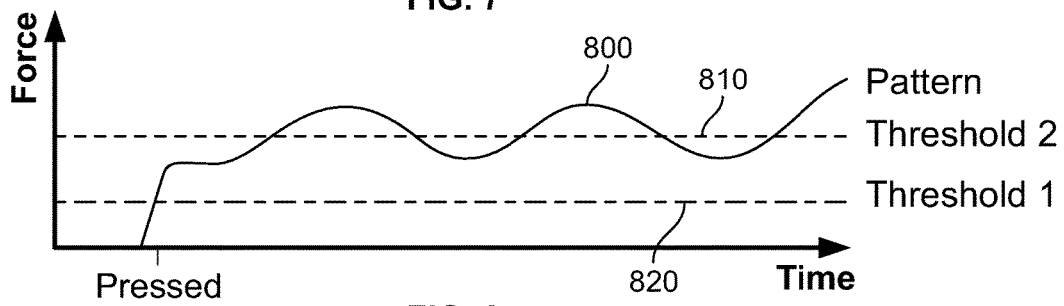
FIG. 8 illustrates another graphical representation of finger force versus time received by a user interface of the instant disclosure.

FIG. 8 shows a variation of the method shown in FIG. 7. In this embodiment, user force variations 800 applied to a user interface over a period of time may be interpreted to activate one or more features or functions of system 400 when a predetermined number of state changes or force excursions occur across one or more of thresholds 810,820. To infer user intent, system 400 may detect force variations over a period of time received by the user on, for example, user interface or display 411 and determine whether the force variations above and below threshold 810, for example, match a predetermined, target frequency of such force variations, and if so, activate one or more features or functions of system 400.

System 400 may include any or all of the foregoing methods shown in FIGS. 5-8, and may couple any or all of these methods with the registration in the x-y coordinate plane of the user's hand or finger motion across user interface or display 411. In this way, three dimensional user motions may be interpreted by system 400 to activate a function or move vehicle 100.

To provide feedback to the user that vehicle 100 recognizes the user's selected or desired function or motion of vehicle 100, system 400 may be configured to provide a visual indication of such recognition to the user in the user interface or display 411. For example, system 400 may transmit to the mobile device 410 to display on the user interface or display 411 an indication that the input force that system 400 receives from the user is confirmed by one or more of the modules described above as lying within predetermined boundaries or thresholds, or that the user's mobile device 410 is within wireless communications range of vehicle 100. In this way, inadvertent damage or breakage of the user interface or display 411 may be avoided by signaling to the user that harder presses on the interface or display 411 are unnecessary. In some embodiments, system 400 may be configured to communicate haptic feedback to the user via mobile device 410, with or without visual or audio feedback indications in the user interface or display 411 or elsewhere on mobile device 410, concerning the status of a function of system 400 or confirmation of user commands to and from the vehicle 100.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A system for remotely controlling a vehicle, comprising:
   the vehicle including an Esteering system, an Edrive system, an Ebrake system, a processor, and memory;
   a control module coupled to the processor and configured to:
   receive random force variations applied to a touch-sensitive user interface of a mobile device over a period of time, the mobile device being located remotely relative to the vehicle;
   determine that the random force variations are inputs indicative of user intent to control vehicle movement using the mobile device in response to calculating a mathematical mean of the random force variations and determining that the mathematical mean lies within predetermined force thresholds over the period of time; and
   activate movement of the vehicle upon determining that all of the random force variations over the period of time lie within a fixed range surrounding a predetermined pattern of input force variations over the period of time.

2. The system of claim 1, further including the mobile device having the user interface.

3. The system of claim 2, wherein the mobile device includes at least one user selectable display object configured to activate a graphical display of information in the user interface, and the mobile device includes one of a display fob, a mobile phone, a tablet, or a laptop.

4. The system of claim 2, wherein the mobile device includes at least one interface object configured to activate an instruction to move the vehicle, and wherein the control module is configured to transmit to the user interface to display a confirmation that the instruction to move the vehicle lies within the predetermined force thresholds.

5. The system of claim 2, wherein the vehicle includes a wireless communication module configured for receiving wireless messages containing the random force variations over the period of time from the mobile device.

6. The system of claim 5, wherein the wireless messages are received from the mobile device via at least one of WiFi, BLUETOOTH, cellular, Low Frequency (LF), near field communication (NFC), and non-cellular Ultra High Frequency (UHF), and the wireless communication module is configured to transmit a confirmation message to the mobile device that the random force variations over the period of time lie within the predetermined force thresholds.

7. The system of claim 5, wherein the wireless messages are communicated directly to and from the vehicle and the mobile device or are relayed to and from the vehicle via a cloud server.

8. The system of claim 1, including an authentication module configured to authenticate a user to enable authenticated access to the system to remotely command and control the movement of the vehicle, and wherein the control module is configured to control the movement of the vehicle in response to determining that the random force variations lie within the predetermined force thresholds over the period of time.

9. The system of claim 8, wherein the vehicle further includes the authentication module.

10. A system for remotely controlling a vehicle, comprising:
    the vehicle including an Esteering system, an Edrive system, an Ebrake system, a processor, and memory;

a control module coupled to the processor and configured to:
receive random force variations applied to a touch-sensitive user interface of a mobile device over a period of time, the mobile device being located remotely relative to the vehicle;
determine that the random force variations are inputs indicative of user intent to control vehicle movement using the mobile device in response to calculating a mathematical mean of the random force variations and determining that the mathematical mean lies within predetermined force thresholds over the period of time; and
activate movement of the vehicle upon determining that all of the random force variations over the period of time match a predetermined pattern of input force variations over the period of time.

11. A system for remotely controlling a vehicle, comprising:
the vehicle including an Esteering system, an Edrive system, an Ebrake system, a processor, and memory;
a control module coupled to the processor and configured to:
receive random force variations applied to a touch-sensitive user interface of a mobile device over a period of time, the mobile device being located remotely relative to the vehicle;
determine that the random force variations are inputs indicative of user intent to control vehicle movement using the mobile device in response to calculating a mathematical mean of the random force variations and determining that the mathematical mean lies within predetermined force thresholds over the period of time; and
activate movement of the vehicle upon determining that the random force variations over the period of time and x-y coordinate positions of a user input lie within a range of thresholds associated with a predetermined pattern of input force variations and predetermined x-y coordinate positions over the period of time.

12. A system for remotely controlling a vehicle, comprising:
the vehicle including an Esteering system, an Edrive system, an Ebrake system, a processor, and memory;
a control module coupled to the processor and configured to receive force variations applied to a touch-sensitive user interface of a mobile device over a period of time, the mobile device being located remotely relative to the vehicle, wherein the control module is further configured to determine that the force variations are inputs indicative of user intent to control vehicle movement using the mobile device upon determining that a magnitude of the force variations lie outside predetermined upper and lower force thresholds over the period of time; and
an authentication module configured to determine whether the force variations over the period of time match a predetermined force pattern associated with validation of user inputs, wherein the vehicle movement is activated when the force variations over the period of time match the predetermined force pattern.

13. The system of claim 12, wherein the vehicle includes a wireless communication module configured for receiving wireless messages containing the force variations over the period of time from the mobile device.

14. The system of claim 12, wherein the movement of the vehicle is activated when all of the force variations over the period of time lie within a fixed range surrounding the predetermined force pattern over the period of time.

15. The system of claim 12, wherein the movement of the vehicle is further activated when x-y coordinate positions of a user input lie within a range of thresholds associated with predetermined x-y coordinate positions over the period of time.

16. The system of claim 12, wherein the vehicle further includes the authentication module.

17. The system of claim 12, further comprising the mobile device.

* * * * *